(12) United States Patent
Jenart et al.

(10) Patent No.: US 10,974,742 B2
(45) Date of Patent: Apr. 13, 2021

(54) RAILCAR ADAPTER FOR CONNECTING A RAILCAR BODY TO A BEARING

(71) Applicant: Aktiebolaget SKF, Gothenburg (SE)

(72) Inventors: Gautier Jenart, Saint Herblain (FR); Ludovic Fenayon, Montbazon (FR); Thierry Le Moigne, Luynes (FR)

(73) Assignee: Aktiebolaget SKF, Gothenburg (SE)

( * ) Notice: Subject to any disclaimer, the term of this patent is extended or adjusted under 35 U.S.C. 154(b) by 239 days.

(21) Appl. No.: 15/993,865

(22) Filed: May 31, 2018

(65) Prior Publication Data

US 2019/0367053 A1 Dec. 5, 2019

(51) Int. Cl.
| | |
|---|---|
| *B61F 15/06* | (2006.01) |
| *B61F 15/12* | (2006.01) |
| *B61F 15/22* | (2006.01) |
| *B61F 5/26* | (2006.01) |

(52) U.S. Cl.
CPC ............... *B61F 15/06* (2013.01); *B61F 5/26* (2013.01); *B61F 15/12* (2013.01); *B61F 15/22* (2013.01); *F16C 2326/10* (2013.01)

(58) Field of Classification Search
CPC .......... B61F 15/00; B61F 15/02; B61F 15/06; B61F 15/12; B61F 15/20; B61F 15/22; B61F 15/26; B61F 15/32; B61F 5/26
See application file for complete search history.

(56) References Cited

U.S. PATENT DOCUMENTS

| | | | |
|---|---|---|---|
| 3,272,573 A | 9/1966 | Payson | |
| 4,687,211 A | 8/1987 | Bessone | |
| 5,237,933 A | 8/1993 | Bucksbee | |
| 5,794,538 A * | 8/1998 | Pitchford | B61F 5/32 105/218.1 |
| 5,799,582 A * | 9/1998 | Rudibaugh | B61F 5/32 105/222 |
| 7,143,700 B2 | 12/2006 | Forbes | |
| 7,527,131 B1 | 5/2009 | Wike | |
| 7,775,163 B2 * | 8/2010 | Forbes | B61F 5/122 105/224.1 |
| 7,966,946 B1 * | 6/2011 | Novak | B61F 5/32 105/218.1 |
| 8,272,333 B2 | 9/2012 | Forbes | |

(Continued)

FOREIGN PATENT DOCUMENTS

| | | |
|---|---|---|
| EP | 3168106 A1 | 5/2017 |
| WO | 2016099876 A1 | 6/2016 |

*Primary Examiner* — Jason C Smith
(74) *Attorney, Agent, or Firm* — Garcia-Zamor Intellectual Property Law; Ruy Garcia-Zamor; Bryan Peckjian

(57) ABSTRACT

A railcar adapter for radially connecting a railcar body to a bearing. The railcar adapter includes an adapter body having two lateral channels each delimited by a pair of opposed lugs and a lateral surface perpendicular to the opposed lugs, lateral channels being adapted to cooperate with the railcar body. The railcar adapter also includes two frontal surfaces, an inner surface acting as a bearing seat for the bearing, and an outer surface. The railcar adapter provides two frontal flanges that inwardly protrude with respect to the inner surface, and that delimit with the inner surface a housing for the bearing, and at least one of the flanges is distinct from the adapter body and is mounted to a frontal surface of the body.

14 Claims, 5 Drawing Sheets

(56) References Cited

U.S. PATENT DOCUMENTS

| | | | |
|---|---|---|---|
| 8,893,626 B2* | 11/2014 | Berg | B61F 5/32 |
| | | | 105/220 |
| 9,434,393 B2 | 9/2016 | Gotlund | |
| 10,384,695 B2 | 8/2019 | Fenayon | |
| 10,399,578 B2 | 9/2019 | Fenayon | |
| 10,576,999 B2 | 3/2020 | Fenayon | |
| 10,727,718 B2 | 7/2020 | McGoogan | |
| 2014/0318412 A1* | 10/2014 | East | B61F 5/28 |
| | | | 105/218.1 |
| 2015/0183442 A1* | 7/2015 | Gotlund | B61F 5/26 |
| | | | 105/224.05 |
| 2017/0129510 A1 | 5/2017 | Golembiewski | |
| 2017/0137040 A1* | 5/2017 | Fenayon | B61F 15/06 |
| 2017/0137041 A1* | 5/2017 | Fenayon | B61F 15/12 |
| 2017/0137042 A1 | 5/2017 | Fenayon | |
| 2019/0367052 A1 | 12/2019 | Jenart | |
| 2019/0367053 A1* | 12/2019 | Jenart | B61F 15/22 |
| 2019/0367054 A1* | 12/2019 | Jenart | B61F 15/12 |
| 2019/0367055 A1* | 12/2019 | Jenart | B61F 15/12 |
| 2019/0367056 A1* | 12/2019 | Jenart | B61F 15/06 |
| 2020/0198667 A1 | 6/2020 | Zeitler | |

* cited by examiner

RAILCAR ADAPTER FOR CONNECTING A RAILCAR BODY TO A BEARING

TECHNOLOGICAL FIELD

The present invention relates to the field of bearing adapters for a railcar.

BACKGROUND

A railcar generally comprises a bogie frame provided with a pair of side frames on each side having downwardly opening jaws. A bearing adapter is vertically moveable within the jaws and rests on a bearing mounted on a railcar axle carrying a wheel of the railcar. The bearing adapter is thus a rigid connection between the bogie frame of the railcar and the bearing. Typically, a bearing for a railcar axle fits around a journal at the end of the railcar axle where it is mounted between a backing ring assembly and an end cap.

However, the railcar adapter may move with respect to the bearing. The load applied by the bogie frame through the adapter may not be well distributed on the bearing, notably on the rolling elements when the bearing is of the rolling bearing type. This results in wear on the inner surface and the outer surface of the railcar adapter, as well as in failure of the bearing.

Moreover, the railcar adapter may come into contact with the backing ring or the end cap of bearing. This results in unexpected wear of these parts and then reduce their service life.

The railcar displacement with respect to the bearing can also lead to a direct contact between the adapter and one of the bearing seals. In that case, bearing is not suitably sealed. Then pollution with contaminant particles, dust, and water may enter the bearing from the exterior, and potentially damage the bearing parts.

Typically, bearings are filled with lubricant, in particular grease, to lubricate the rolling contact surfaces that support in rotation the railcar axle. The aim is to reduce friction and heat exchange, so as to reduce wear of the parts and risks of break. However, bearing seals affected by a railcar adapter displacement may lead to lubricant leakage to the outside of bearing, and then in failure to the bearing.

These and other problems are addressed by embodiments of the present invention.

SUMMARY

To this end, the invention relates to a railcar adapter for radially connecting a railcar body to a bearing. The railcar adapter comprises an adapter body having two lateral channels each delimited by a pair of opposed lugs and a lateral surface perpendicular to the opposed lugs. Lateral channels are adapted to cooperate with the railcar body. The adapter body further comprises two frontal surfaces, an inner surface acting as a bearing seat for the bearing, and an outer surface. The railcar adapter also comprises two frontal flanges that inwardly protrude with respect to the inner surface, and that delimit with the inner surface a housing for the bearing. At least one of the flanges is distinct from the adapter body and is mounted to a frontal surface of the body.

Such railcar adapter with a separated flange facilitates the railcar adapter mounting onto the bearing.

It further permits to adjust the clearance between the flanges and the bearing, and then to improve the maintain of bearing within the railcar adapter. The railcar adapter is limited in relative displacement with respect to the bearing.

Such arrangement improves the service life of the railcar adapter and the bearing by preventing relative misalignment and wear.

The adapter body of railcar adapter may be standardized, the at least one flange being adaptable depending on the application characteristics.

According to further aspects of the invention which are advantageous but not compulsory, such a railcar adapter may incorporate one or several of the following features:

One frontal flange is mounted to the adapter body, and the other frontal flange is formed integral with the body.

The two frontal flanges are mounted to the adapter body.

The at least one flange is connected to a fixing plate that is mounted to the outer surface of the adapter body.

The two frontal flanges are connected by a fixing plate so as to form a part mounted onto the adapter body.

The at least one flange and the fixing plate are formed integral.

The fixing plate is provided with a recess that receives a protruding pin provided to the outer surface of adapter body.

The at least one flange is securely fixed to the frontal surface of adapter body by fixing means.

The fixing plate is securely fixed to the outer surface of adapter body by fixing means.

The fixing means are screws.

At least one frontal flange is provided with a hook that protrudes towards the bearing. The hook is dedicated to cooperate with the bearing.

The outer surface of adapter body is adapted to be in direct radial contact with the railcar body.

The railcar adapter is further provided with a top cover mounted onto one of the outer surface of adapter body and the fixing plate, the top cover being adapted to be in direct radial contact with the railcar body.

The inner surface has, for example, a concave shape of constant radius so as to sit on the bearing.

The adapter body is made from metal, for example, by casting. For example, the adapter body is made from cast steel or cast iron.

The at least one flange is made from metal.

The at least one flange is made from plastic or polymeric material.

According to another aspect, the invention relates to a railcar adapter assembly comprising a railcar adapter according to any of the preceding embodiments, a bearing mounted inside the railcar adapter, a backing ring adapted to come into axial contact with the bearing at a first side, and an end cap assembly adapted to come into axial contact with the bearing at another side, opposite to the first side.

In one embodiment, the bearing comprises at least one inner ring and at least one outer ring mounted in radial contact with the inner surface of the railcar adapter.

In one embodiment, the bearing comprises at least one row of rolling elements, arranged between raceways provided on the inner and outer rings.

In one embodiment, the inner ring of the bearing is made in two parts, axially separated by an axial spacer.

According to another aspect, the invention relates to railcar axle comprising a railcar adapter assembly according to any of the preceding embodiments, a shaft being rotatably mounted about an axis of rotation relative to a railcar adapter, inside the bearing. The shaft comprises a first end mounted radially inside the backing ring and a second end, opposite to the first end, secured to the end cap assembly.

BRIEF DESCRIPTION OF THE DRAWINGS

Other advantages and features of the invention will emerge upon examining the detailed description of embodiments, which are in no way limiting, and the appended drawings wherein.

DETAILED DESCRIPTION

Figure 1:
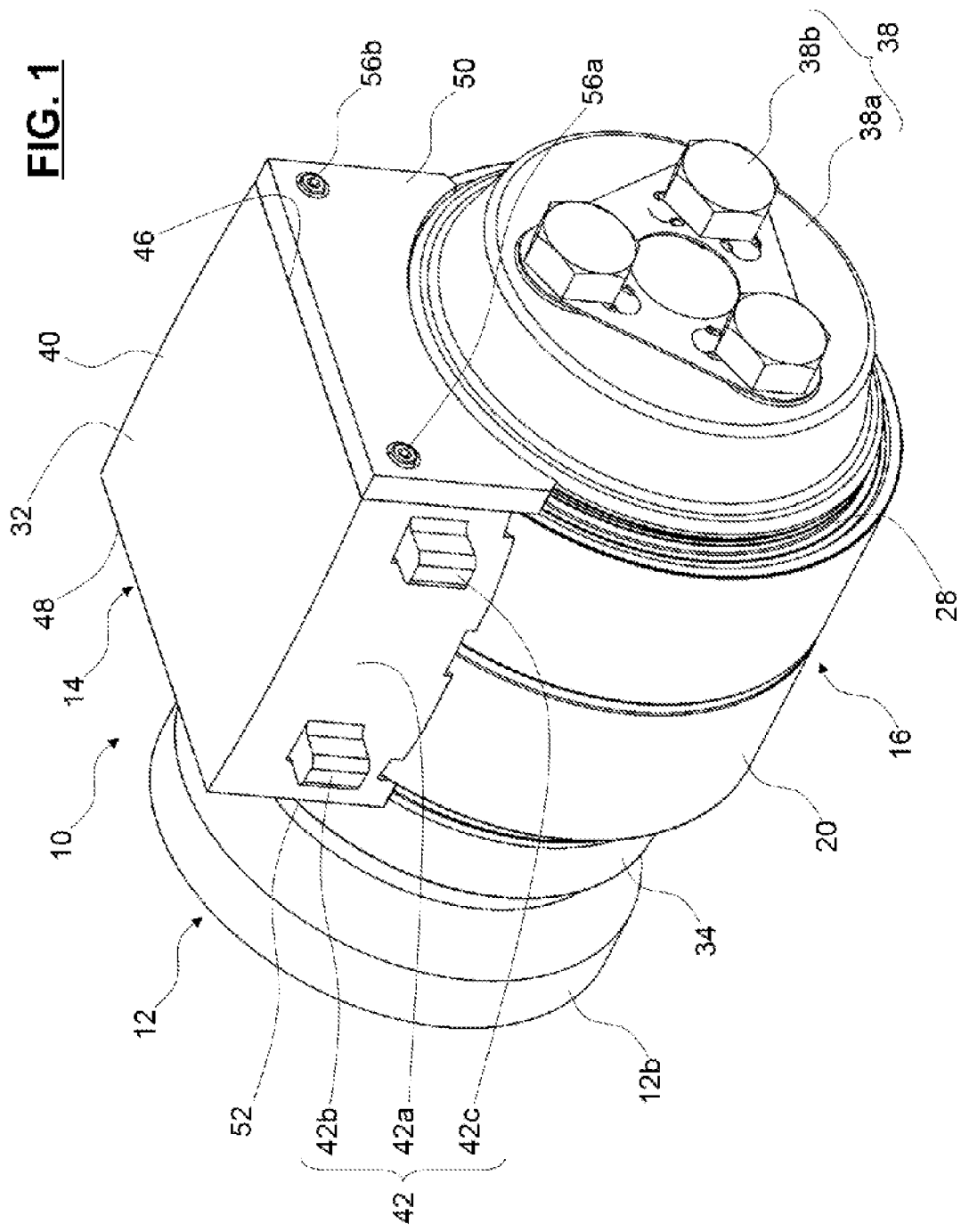
FIG. 1 is a perspective view of a railcar axle according to a first embodiment of the invention.
Figure 2:
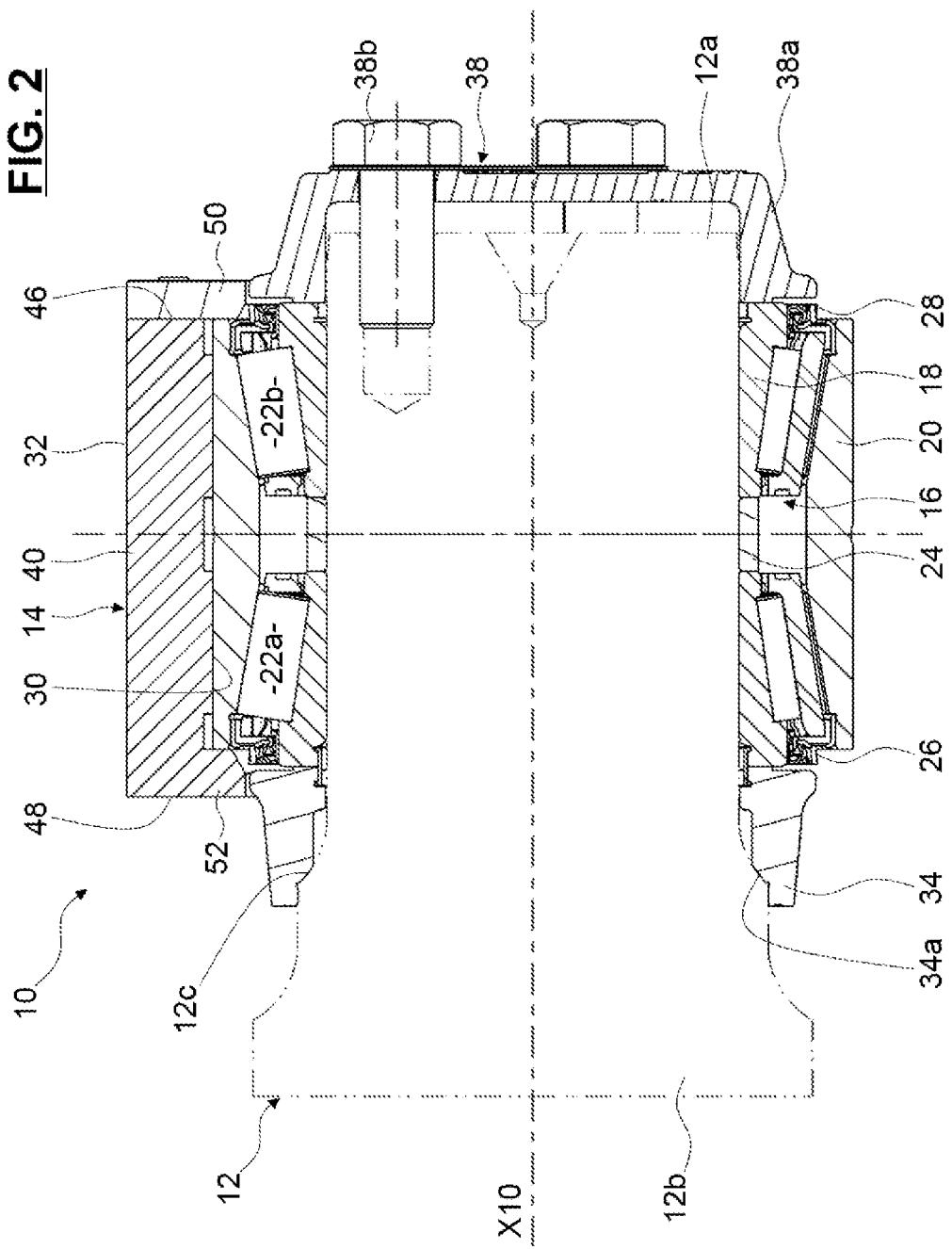
FIG. 2 is an axial cross-section of the railcar axle of FIG. 1.

Referring to FIGS. 1 and 2, a railcar axle 10 is provided for binding the bogie frame of a railcar to the wheels (not shown). The railcar axle 10 comprises a shaft 12 (in dotted lines in FIG. 2), being rotatably mounted about an axis of rotation X10 relative to a railcar adapter 14. The railcar adapter 14 is secured to the railcar bogie frame, the shaft 12 being secured to the wheels.

A bearing 16 is radially provided between the railcar adapter 14 and the shaft 12. As illustrated in FIG. 2, the bearing 16 is of the rolling bearing type, and comprises an inner ring 18 mounted on the shaft 12, an outer ring 20 mounted inside the railcar adapter 14 and two rows of rolling elements 22a, 22b, for example rollers, arranged between raceways provided on the inner and outer rings 18, 20. The inner ring 18 is, for example, made in two parts, axially separated by an axial spacer 24. In this embodiment, the bearing 16 is a tapered rollers bearing.

The bearing 16 is further provided with sealing means 26, 28 on both axial ends. Sealing means 26, 28 close a radial space defined between the inner ring 18 and the outer ring 20. The rolling elements 22a, 22b are arranged in the sealed radial space.

The railcar adapter 14 is secured to the outer ring 20 by its radially inward side or bearing seat side 30 and is mounted inside the bogie frame by its radially outward side or frame seat side 32.

The shaft 12 comprises a journal 12a and a dust guard having a cylindrical surface 12b whose diameter is bigger than the diameter of the journal 12a. A concave fillet 12c connects the cylindrical surface 12b on the journal 12a. The inner ring 18 of the bearing is mounted on the journal 12a.

As illustrated, the railcar axle 10 further comprises a backing ring 34 having an inner surface 34a adapted to radially come into contact with the outer surface of the shaft 12, at the fillet 12c side and to axially come into contact with the inner ring 18 of the bearing 16. Accordingly, the inner surface 34a of backing ring 34 has a rounded shape, almost complementary to that of the fillet 12c.

The railcar axle 10 also comprises an end cap assembly 38. The end cap assembly 38 includes an end cap 38a provided for being a stop element in case of a leftward translation (relative to FIG. 2) of the shaft 12 relative to the inner ring 18. Therefore, the end cap 38a is reliably secured to the journal 12 by means of three cap screws 38b and comes in axial contact with the inner ring 18 of the bearing 16.

As illustrated in detail on FIG. 1, the railcar adapter 14 comprises an adapter body 40 provided with two lateral channels 42. In the FIG. 1, only one channel 42 is illustrated, the adapter body 40 comprising another lateral channel on the opposite lateral side. Each of the lateral channels 42 is axially delimited by a pair of opposed lugs 42b, 42c and a lateral surface 42a perpendicular to the lugs. Each lateral channel 42 has a U-shape and is adapted to engage with a lug of a jaw (not shown) of the bogie frame, so as to act as an insertion guide between the adapter and the bogie frame.

The body 40 of the railcar adapter 14 further comprises two frontal surfaces 46, 48, the inner surface 30 acting as a bearing seat in radial contact with the outer ring 20 of the bearing 16, and the outer surface 32 acting as a frame seat in radial contact with the bogie frame.

The inner surface 30 has a concave shape of constant radius so as to sit on the outer cylindrical surface of the outer ring 20 of the bearing 16.

The adapter body 40 is made from metal by any suitable process, such as, for example, by casting. For example, the body 40 is made from steel or cast iron.

The railcar adapter 14 also comprises a first and a second frontal flanges 50, 52 directed radially inwards. The flanges 50, 52 radially inwardly protrude with respect to the inner surface 30. The flanges 50, 52 are axially opposite one each other. The flanges 50, 52 delimit with the inner surface 30 a housing for the outer ring 20 of bearing 16. The outer ring 20 is axially arranged between the flanges 50, 52.

According to this first embodiment of the invention, the first flange 50 is distinct from the adapter body 40 and is mounted to the frontal surface 46 of the body 40. The second flange 52 is formed integral with the adapter body 40.

The lateral edges of flange 50 are aligned with the lateral surfaces 42a of body 40.

The first flange 50 is securely fixed to the frontal surface 46 by any suitable fixing means. In the illustrated embodiment of FIG. 1, the fixing means consist in two screws 56a, 56b passing through axial holes provided to the flange 50, and engaged in corresponding threaded holes (not shown) provided to the frontal surface 46.

The axial clearance between the outer ring 20 and the flanges 50, 52 can be precisely adjusted so to prevent any relative displacement between the railcar adapter 14 and the bearing 16.

The flange 50 is made from metal by any suitable process, such as, for example, by casting. For example, the flange 50 is made from steel or cast iron. Alternatively, the flange is made from a plastic or polymeric material.

Advantageously, and according to an alternate embodiment not illustrated, at least one of the two flanges 50, 52 is provided with a hook. The hook protrudes axially inwardly towards the bearing and cooperates with an axial end of the outer ring 20 of bearing 16. The hook permit to radially maintain the railcar adapter 14 onto the outer ring 20 of bearing 16.

Figure 3:
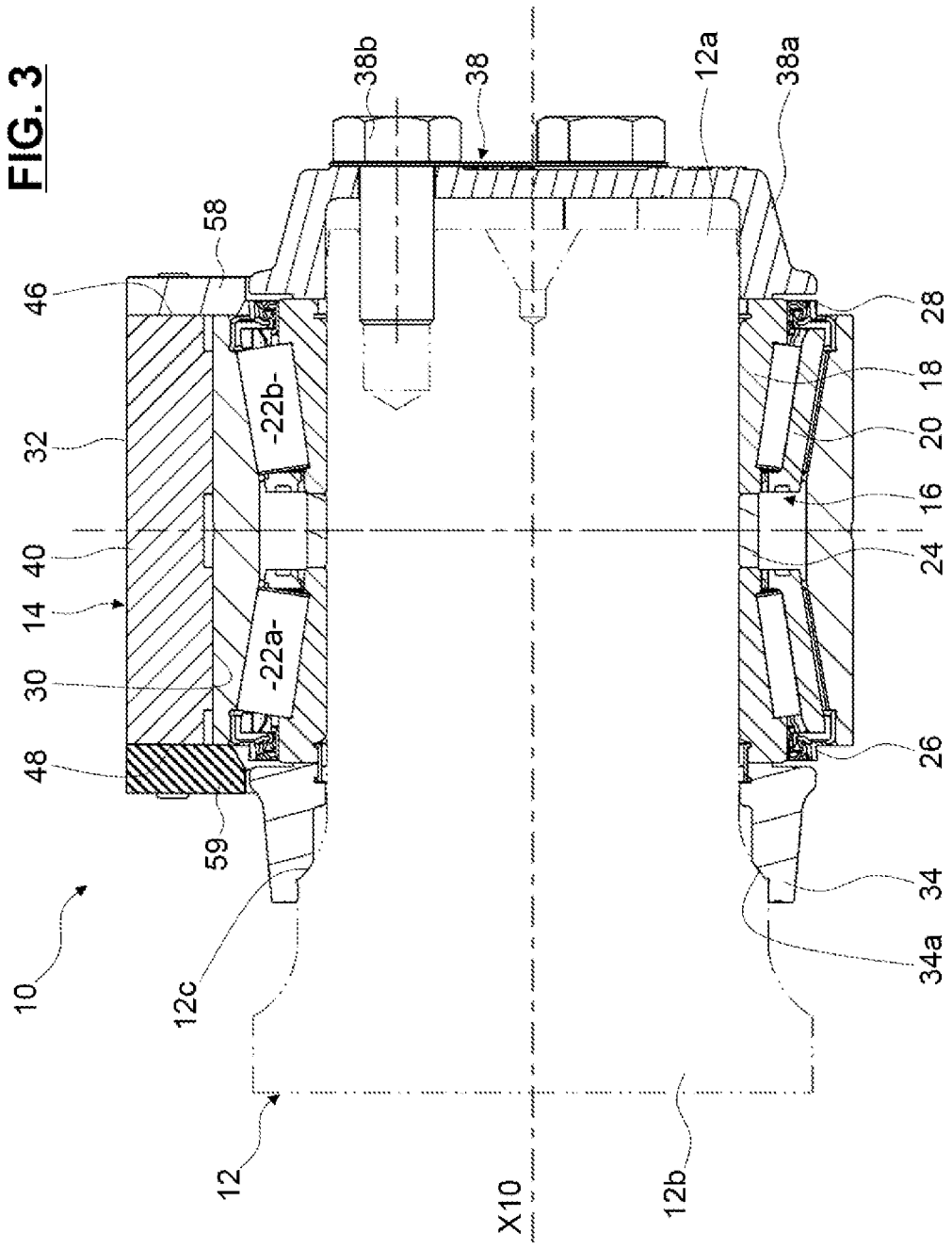
FIG. 3 is an axial cross-section of railcar axle according to a second embodiment of the invention.

Referring to a second embodiment of the invention illustrated in the FIG. 3, the railcar adapter 14 is provided with two flanges 58, 59 mounted and securely fixed to frontal surfaces 46, 48, respectively, of adapter body 40.

Figure 4:
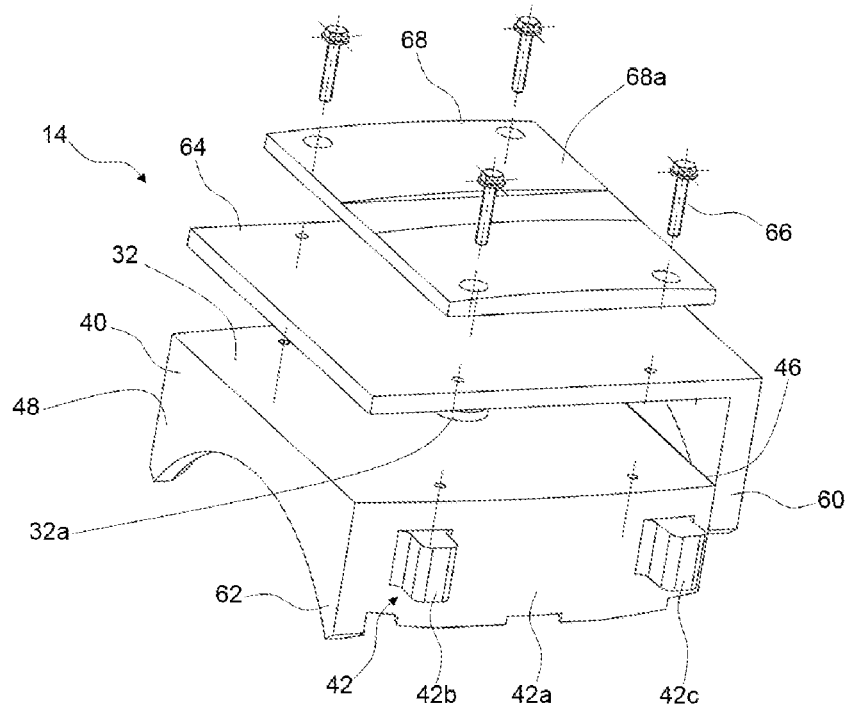
FIG. 4 is a perspective exploded view and FIG. 5 is a perspective assembled view of a railcar adapter for a railcar axle according to a third embodiment of the invention.
Figure 5:
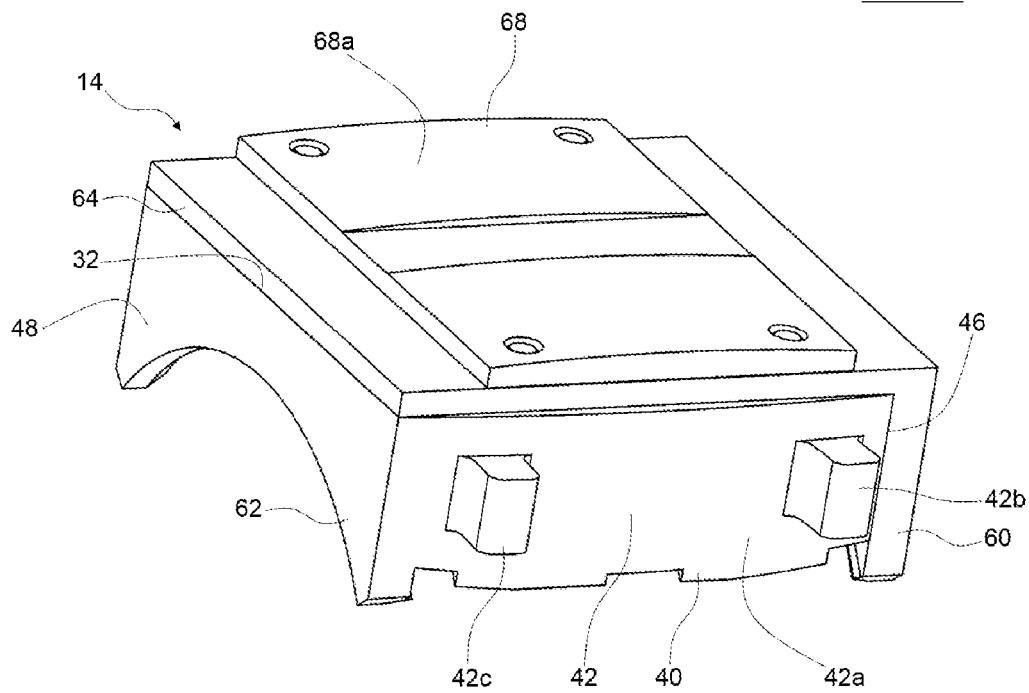

A third embodiment of the invention is illustrated in the FIGS. 4 and 5, wherein the same elements have the same references, and only differs with the previous embodiments in that the railcar adapter 14 comprises a frontal flange 60 provided with a fixing plate 64.

The flange 60 extends radially inwardly, and is mounted axially against the frontal surface 46 of adapter body 40.

The fixing plate 64 axially extends from outer edge of the flange 60 and is directed towards the other flange 62. In this embodiment, the other flange 62 if formed integral with the adapter body 40. The fixing plate 64 radially covers the outer surface 32 of the adapter body 40.

The flange 60 and the fixing plate 64 are formed integral. The fixing plate 64 is securely fixed to the outer surface of adapter body 40 by any suitable fixing means. In the illustrated embodiment of FIG. 4, the fixing means are a plurality of screws 66 passing through radial holes provided to the fixing plate 64, and engaged in corresponding threaded holes provided to the outer surface 32.

The fixing plate 64 is provided with a recess receiving a radially outwardly projecting pin 32a provided to outer surface 32. The pin 32a permits to center the fixing plate 64 with respect to the adapter body 40.

Advantageously, the railcar adapter 14 is further provided with a top cover 68 mounted onto the outer surface of fixing plate 64. The top cover has an outer surface 68a acting as a frame seat in direct radial contact with the bogie frame. The top cover 68 is advantageously securely fixed to the fixing plate, for example by screws 66, or by other screws. As an alternate not illustrated, the fixing plate 64 has an outer surface acting as a frame seat in direct radial contact with the bogie frame.

Figure 6:
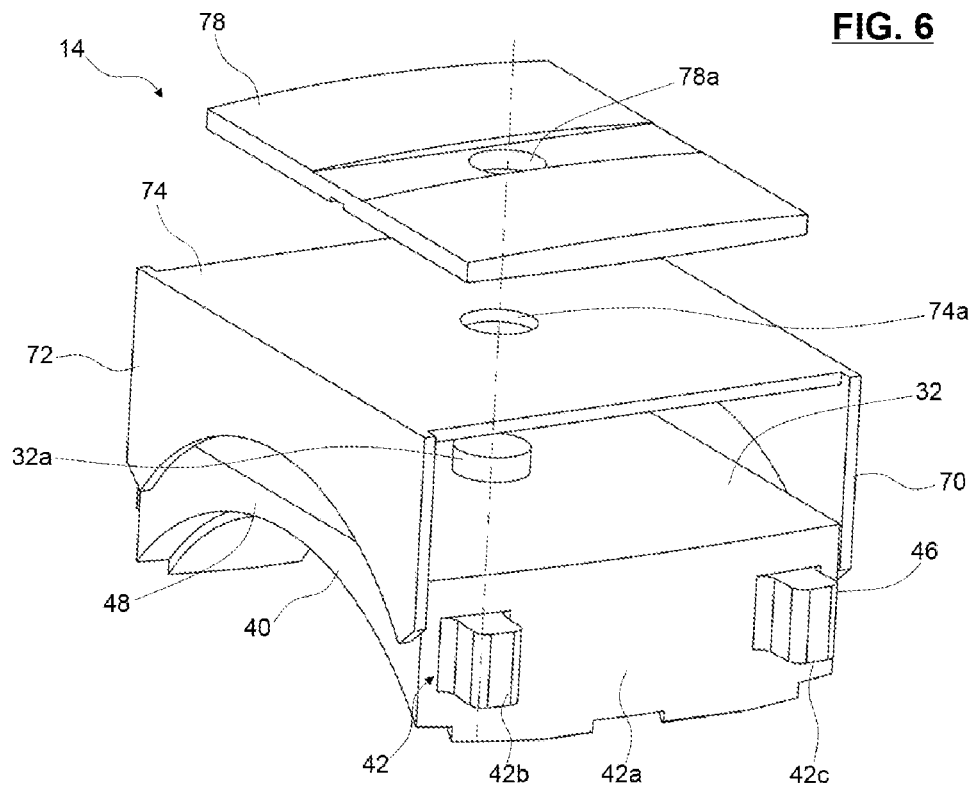
FIG. 6 is a perspective exploded view and FIG. 7 is a perspective assembled view of a railcar adapter for a railcar axle according to a fourth embodiment of the invention.
Figure 7:
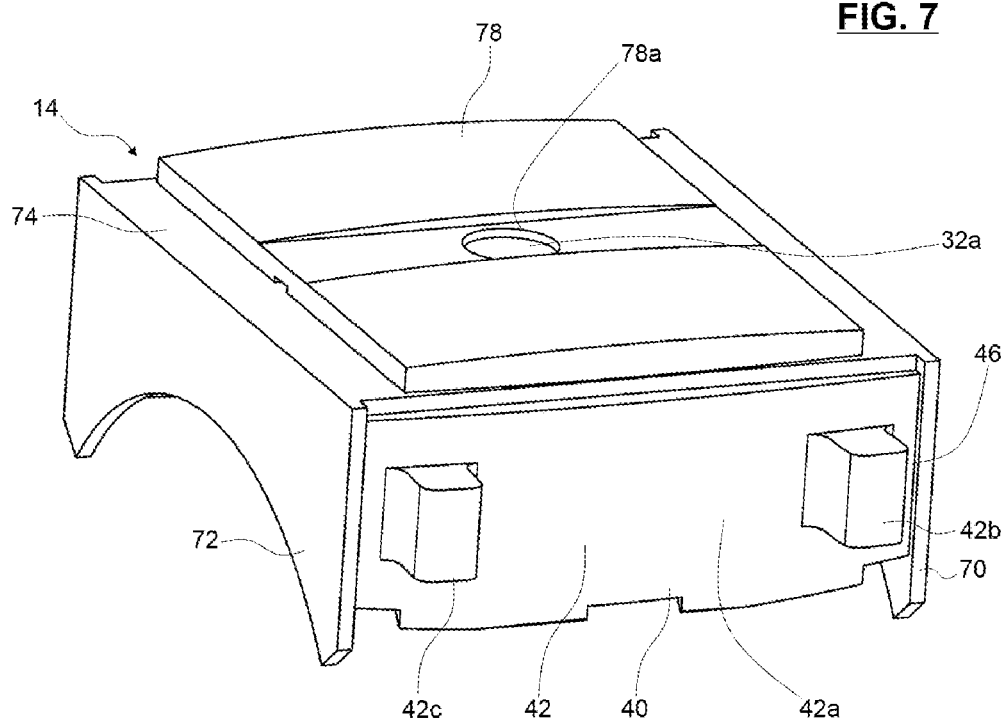

A fourth embodiment of the invention is illustrated in the FIGS. 6 and 7, wherein the same elements have the same references, and only differs with the previous embodiment in that the railcar adapter is provided with two flanges 70, 72 mounted onto frontal surfaces 46, 48 of adapter body 40, the flanges 70, 72 being connected each other by a fixing plate 74.

The first flange 70 and the second flange 72 extend each radially inwardly, and are mounted axially against the frontal surfaces 46, 48, respectively, of adapter body 40.

The fixing plate 74 axially extends between outer edges of the flanges 70, 72. The fixing plate 74 radially covers the outer surface 32 of the adapter body 40.

The flanges 70, 72 and the fixing plate 64 are formed integral. The fixing plate 74 is securely fixed to the outer surface of adapter body 40, for example by screws (not illustrated).

Advantageously, the fixing plate 74 is further provided with a recess 74a receiving a radially outwardly projecting pin 32a provided to outer surface 32. The pin 32a permits to center the fixing plate 74 with respect to the adapter body 40.

Advantageously, the railcar adapter 14 is further provided with a top cover 78 mounted onto the outer surface of fixing plate 74, the top cover 78 acting as a frame seat in direct radial contact with the bogie frame. In this embodiment, the pin 32a extends in a recess 78a provided to the top cover 78. As an alternate not illustrated, the fixing plate 74 has an outer surface acting as a frame seat in direct radial contact with the bogie frame.

It should be noted that the embodiments, illustrated and described were given merely by way of non-limiting indicative examples and that modifications, combinations and variations are possible within the scope of the invention.

The invention has been illustrated on the basis of a rolling bearing provided with at least one row of rolling elements radially disposed between the inner and outer rings. Alternatively, the bearing may be a plain bearing or a sliding bearing comprising one or two rings.

What is claimed is:

1. A railcar adapter for radially connecting a railcar body to a bearing, and comprising an adapter body having:

two lateral channels each delimited by a pair of opposed lugs and a lateral surface perpendicular to the opposed lugs, lateral channels being adapted to cooperate with the railcar body, two frontal surfaces, an inner surface acting as a bearing seat for the bearing, and an outer surface, wherein the railcar adapter also comprises two frontal flanges that inwardly protrude with respect to the inner surface, and that delimit with the inner surface a housing for the bearing, and wherein one of the two frontal flanges is distinct from and mounted to the adapter body, and the other of the two frontal flanges is formed integral with the adapter body.

2. The railcar adapter according to the claim 1, wherein the at least one flange is securely fixed to the frontal surface of adapter body by a fixing means.

3. A railcar adapter for radially connecting a railcar body to a bearing, and comprising an adapter body having:

two lateral channels each delimited by a pair of opposed lugs and a lateral surface perpendicular to the opposed lugs, lateral channels being adapted to cooperate with the railcar body, two frontal surfaces, an inner surface acting as a bearing seat for the bearing, and an outer surface, wherein the railcar adapter also comprises two frontal flanges that inwardly protrude with respect to the inner surface, and that delimit with the inner surface a housing for the bearing, and wherein at least one of the flanges is distinct from the adapter body and is mounted to a frontal surface of the body, the at least one flange being connected to a fixing plate that is mounted to the outer surface of the adapter body.

4. The railcar adapter according to the claim 3, wherein the at least one flange and the fixing plate are formed integral.

5. The railcar adapter according to the claim 3, wherein the fixing plate is provided with a recess that receives a protruding pin provided to the outer surface of adapter body.

6. The railcar adapter according to the claim 3, wherein the fixing plate is securely fixed to the outer surface of adapter body by fixing means.

7. The railcar adapter according to the claim 3, wherein a top cover is mounted onto the fixing plate, the top cover being adapted to be in direct radial contact with the railcar body.

8. A railcar adapter assembly comprising:

a railcar adapter, a bearing mounted inside the railcar adapter, a backing ring adapted to come into axial contact with the bearing at a first side, and an end cap assembly adapted to come into axial contact with the bearing at another side, opposite to the first side, the railcar adapter comprising an adapter body having:

two lateral channels each delimited by a pair of opposed lugs and a lateral surface perpendicular to the opposed lugs, lateral channels being adapted to cooperate with the railcar body, two frontal surfaces, an inner surface acting as a bearing seat for the bearing, and an outer surface, wherein the railcar adapter also comprises two frontal flanges that inwardly protrude with respect to the inner surface, and that delimit with the inner surface a housing for the bearing, and wherein at least one of the two frontal flanges is distinct from the adapter body and is mounted to a frontal surface of the body, wherein at least one of the two frontal flanges is provided with a hook that protrudes towards the bearing, the hook being dedicated to cooperate with the bearing.

9. The railcar adapter assembly according to the claim 8, wherein the bearing comprises at least one inner ring and at least one outer ring mounted in radial contact with the inner surface of the railcar adapter.

10. The railcar adapter assembly according to the claim 8, wherein the bearing comprises at least one row of rolling elements, arranged between raceways provided on the inner and outer rings.

11. The railcar adapter assembly according to the claim 8, wherein the inner ring of the bearing is made in two parts, axially separated by an axial spacer.

12. The railcar adapter assembly according to the claim 8, wherein the at least one flange is connected to a fixing plate that is mounted to the outer surface of the adapter body.

13. The railcar adapter assembly according to the claim 8, wherein at least one lateral surface of adapter body is provided with at least one transverse groove, the lugs being mounted in the groove, the groove being closed at both ends by the frontal flanges mounted onto the frontal surfaces of adapter body.

14. A railcar axle comprising:
a railcar adapter assembly including a bearing mounted inside the railcar adapter,
a backing ring adapted to come into axial contact with the bearing at a first side, and
an end cap assembly adapted to come into axial contact with the bearing at another side, opposite to the first side,
a shaft being rotatably mounted about an axis of rotation relative to a railcar adapter, inside the bearing, the shaft comprising a first end mounted radially inside the backing ring and a second end, opposite to the first end, secured to the end cap assembly, the railcar adapter comprising an adapter body having:
two lateral channels each delimited by a pair of opposed lugs and a lateral surface perpendicular to the opposed Jugs, lateral channels being adapted to cooperate with the railcar body,
two frontal surfaces,
an inner surface acting as a bearing seat for the bearing, and an outer surface,
wherein the railcar adapter also comprises two frontal flanges that inwardly protrude with respect to the inner surface, and that delimit with the inner surface a housing for the bearing, and
wherein at least one of the flanges is distinct from the adapter body and is mounted to a frontal surface of the body.

* * * * *